United States Patent [19]

Higashihara

[11] Patent Number: 5,653,630
[45] Date of Patent: Aug. 5, 1997

[54] AIR CONDITIONING APPARATUS WITH FILM DOOR

[75] Inventor: Akihito Higashihara, Kariya, Japan

[73] Assignee: Nippondenso Co., Ltd., Kariya, Japan

[21] Appl. No.: 539,905

[22] Filed: Oct. 6, 1995

[30] Foreign Application Priority Data

Oct. 7, 1994 [JP] Japan ............... 6-243941

[51] Int. Cl.$^6$ ................................... B60H 1/00
[52] U.S. Cl. ........................... 454/121; 454/156
[58] Field of Search ......................... 454/121, 156, 454/159, 160, 161

[56] References Cited

U.S. PATENT DOCUMENTS

| | | | |
|---|---|---|---|
| 5,105,730 | 4/1992 | Smith | 454/161 |
| 5,326,315 | 7/1994 | Inoue et al. | 454/156 X |

FOREIGN PATENT DOCUMENTS

| | | |
|---|---|---|
| 0459473 | 12/1991 | European Pat. Off. . |
| 0545320 | 6/1993 | European Pat. Off. . |
| 5-310029 | 11/1993 | Japan . |

Primary Examiner—Harold Joyce
Attorney, Agent, or Firm—Cushman, Darby & Cushman IP Group of Pillsbury Madison & Sutro LLP

[57] ABSTRACT

An air conditioning apparatus with a film door for switching outlets to respective positions of a cabin. The film shaped door has a value of flexural rigidity per width of 10 mm in a range between 1.1 and 2.5 ($\mu Nm^2$). An amount of leaked air of 0.00175 ($m^2/s$) or less and an operating force of a step motor for driving the film shaped door of 50 (mN×m) or less are obtained.

6 Claims, 4 Drawing Sheets

AIR CONDITIONING APPARATUS WITH FILM DOOR

BACKGROUND OF THE INVENTION

1. Field of the Invention

The present invention relates to an air conditioning apparatus, wherein a flexible film member having an opening for a passage of an air flow is moved in a casing for switching the direction of the air flow in the casing.

2. Description of Related Art

Japanese Unexamined Patent Publication No. 5-310029 discloses an air conditioning apparatus which includes a flexible film member or film door having an opening for a passage of an air flow. The film member has a first and a second end connected to a driving and a driven shaft, respectively, which are rotatably supported in the casing. The casing defines therein a passageway for the air flow. The film member is arranged so that it is located opposite to air discharge outlets which are formed at the downstream end of the air passageway. Furthermore, a driving means is connected to the driving shaft for rotating the drive shaft, which causes the film door to be moved between a mode where an outlet is opened and a mode where another outlet is opened. As a result, a desired switching from mode to mode become possible.

A test was done by the inventors of this application as to the air conditioning apparatus including a film door moved for switching a direction of an air flow in a casing. According to this test, it was firstly found that, when the flexural rigidity of the film door is too small, i.e., the film door is too flexible, an air flow pressure applied to the film door causes the latter to be wrinkled. Such an occurrence in the wrinkle causes a gap or gaps to be created between the film door and the casing, thereby allowing the air flow to leak via the gap or gaps. Thus, the flexural rigidity of the film door should be larger than a predetermined value in order to obtain a desired level of a sealing characteristic.

However, an excessively large value of the flexural rigidity would cause the torque for winding the film by a driving shaft to be excessively increased. Namely, due to the increased rigidity, the film door is less flexible, which makes it difficult for the film door to be neatly wound on the drive shaft. As a result, a force for winding the film door on the drive shaft is inevitably increased. Such a requirement for increasing the drive torque can be met by increasing the power which is transmitted by the drive motor. However, such an increase in the drive power necessarily increase the size of the drive motor, which is disadvantageous in view of a limited space, in the air conditioning apparatus, available for storing the drive motor. In short, there is requirements that, in order to obtain a desired sealing ability, the flexural rigidity of the film door should be larger than a predetermined value, while, from the view point of the operating force, the flexural rigidity of the film door should be smaller than a predetermined value.

SUMMARY OF THE INVENTION

An object of the present invention is to provide an air conditioning apparatus capable of obtaining a desired sealing between the film member and the casing.

Another object of the present invention is to provide an air conditioning apparatus capable of obtaining as small an operating force as possible.

Still another object of the present invention is to provide an air conditioning apparatus capable of harmonizing a requirement of an increased sealing between the film shaped member and the casing and a requirement of a reduced operating force.

According to the present invention, an air conditioning apparatus for a compartment to be air conditioned is provided, comprising:

a casing defining therein a passageway for an air flow to be introduced into the compartment;

a flexible film member cooperating with the passageway for controlling the flow of the air;

a first shaft rotatably supported by the casing, while one of the ends of the flexible film member is connected to the first shaft, so that the member is wound on the first shaft;

a second shaft rotatably supported by the casing, while the other end of the flexible film member is connected to the second shaft, so that the member is wound on the second shaft, and;

means for generating a rotating movement applied to at least one of the first and second shafts so that the flexible film member is moved for causing a degree of a cooperation between the film member and the passageway to be varied;

the flexible film shaped member having a value of a flexural rigidity per width of 10 mm in a range between 1.1 and 2.5 ($\mu Nm^2$).

BRIEF DESCRIPTION OF ATTACHED DRAWINGS

DESCRIPTION OF PREFERRED EMBODIMENTS

Figure 1:
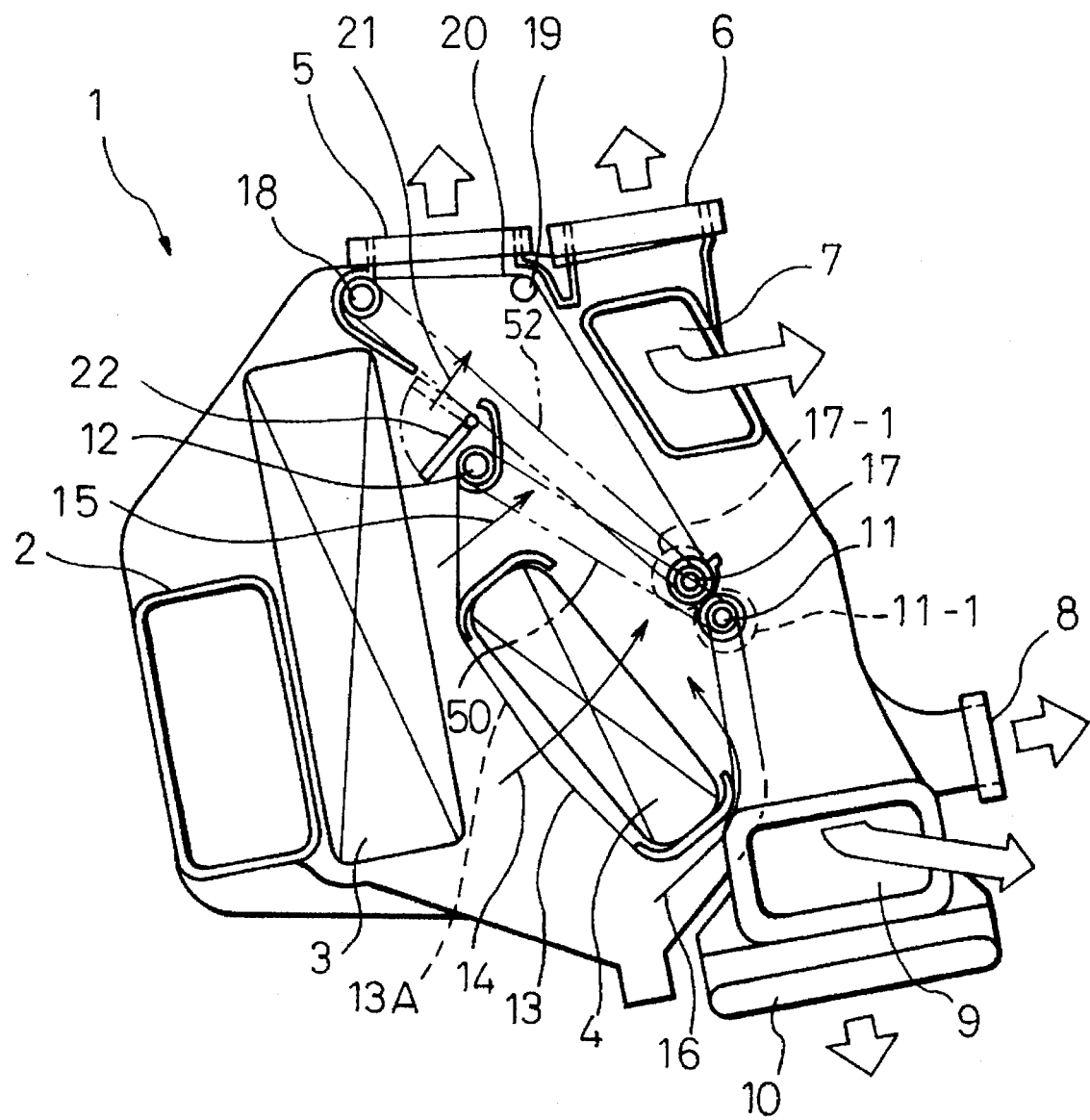
FIG. 1 is a side view of an air conditioning apparatus according to the present invention.

An embodiment of the present invention will be explained with reference to attached drawings directed to an application of the present invention to an air conditioning apparatus for a vehicle. The air conditioning apparatus includes a casing 1 which forms an opening 2, to which a blower (not shown) is connected in such a manner that a flow of an air generated by the blower when the latter is driven is introduced, via the opening 2, into the casing 1. Arranged inside the casing 1 along the direction of the air flow is an evaporator 3 and a heater core 4.

The evaporator 3 has heat exchanging pipes (not shown) for the passage of a flow of a refrigerant. The evaporator 3 is a heat exchanger for executing a heat exchange operation between the air flow contacting the heat exchanging pipes and the flow of a refrigerant inside the pipes, so that the air flow is cooled. In a well known manner, together with a compressor, a condenser and an expansion valve, which are not shown in the drawing, the evaporator 3 constructs a refrigerating apparatus for executing a refrigerating cycle.

The heater core 4 has heat exchanging pipes (not shown) for a passage of a flow of an engine cooling water taken out from an engine cooling system. The heater core 4 is a heat exchanger for executing a heat exchange operation between the air flow contacting the pipes and the flow of the engine cooling water inside the pipes, so that the air flow is heated.

The case 1 of the air conditioning apparatus forms, at its downstream end, a plurality of outlet openings (not shown), which are connected to ducts 5 to 10, which are opened to the cabin in such a manner that the air flows are discharged to the cabins at desired locations thereof. Namely, the duct 5 forms, at its downstream end, a defroster outlet (not shown), which is opened to the cabin at a location such that the air flow is discharged toward an inner surface of a wind shield (not shown). The duct 6 forms, at its downstream end, an upper-center outlet (not shown), which is opened to the cabin at a location such that the air flow is discharged toward an upper part of a driver or a passenger on a front seat at a side adjacent the center of the cabin. The duct 7 forms, at its downstream end, an upper-side outlet (not shown), which is opened to the cabin at a location such that the air flow is discharged toward an upper part of a driver or passenger on a side adjacent a side window. Furthermore, the duct 8 is, at its downstream end, a rear-upper outlet (not shown), which is opened to the cabin at a location such that the air flow is discharged to an upper part of a passenger on a rear seat of the cabin. The duct 9 is, at its downstream end, a lower-front outlet (not shown), which is opened to the cabin at a location such that the air flow is discharged to a lower part of a passenger on a front seat of the cabin. Finally, the duct 10 is, at its downstream end, a lower-rear outlet (not shown), which is opened to the cabin at a location such that the air flow is discharged to a lower part of a passenger on a rear seat of the cabin.

An air mix door drive shaft 11 and an air mix door driven shaft 12 are rotatably supported by the casing 1, so that the shafts 11 and 12 extend transverse to the direction of the flow of the air in the passageway as shown by the arrows. A reference numeral 13 is an air mix door, which is formed as a flexible film and which has opposite ends along its length connected to the shafts 11 and 12, respectively. Furthermore, the shafts 11 and 12 are connected with each other by means of a pulley and belt mechanism schematically illustrated by a phantom line 50, so that a rotating movement is transmitted between the shafts 11 and 12. Thus, a rotating movement is one direction applied to the drive shaft 11 causes the film air mix door 13 to be taken out from the driven shaft 12 and to be wound on the drive shaft 11. Contrary to this, a rotating movement in the opposite direction applied to the drive shaft 11 causes the film shaped air mix door 13 to be taken out from the drive shaft 11 and to be wound on the driven shaft 12. As a result, openings formed in the film shaped air mix door 13 are moved between a first position, where the opening is faced with the heater core 4, so that a hot air flow passageway 14 is created for allowing the cooled air flow from the evaporator 3 to be passed through the heater core 4, and a second position, where by-pass passageways 15 and 16 are created, so that the cooled air flow from the evaporator 3 by-passes the heater core 4. Furthermore, the air mix door 13 can take, between the first and second positions, a desired intermediate position, where a desired ratio is obtained between the flow passed through the hot air flow passageway 14 and the air flow passed through the by-pass passageways 15 and 16. The hot air passed through the passageway 14 and the cooled air passed through the by-pass passageways 15 and 16 are combined and discharged from the desired outlets. Thus, the temperature of the air after being combined is varied in accordance with the above ratio, i.e., the position of the opening of the air mix door 13 with respect to the passageways 14 to 16.

The air mix door drive shaft 11 extends transverse to the flow of the air in the casing 1 and has an end located outside the casing 1 and connected to a rotary drive means such as a stepping motor 11-1. The stepping motor 11-1 can obtain a desired rotating position, which causes the opening of the air mix door 13 to be stopped at a desired position, so that the ratio between the flow passed through the hot air flow passageway 14 and the air flow passed through the by-pass passageways 15 and 16 is desirably controlled. In a well known manner, the rotating position of the drive shaft 11 is controlled by a number of an electric pulses from a control circuit (not shown) realized as a microcomputer system.

Furthermore, a mode switching door drive shaft 17, a mode switching door driven shaft 18, and an intermediate shaft 19 are also rotatably supported by the casing 1. A mode switching door 20 also made of an flexible film material has opposite ends along its length which are connected to the shafts 17 and 18, respectively. Furthermore, the shafts 17 and 18 are connected with each other by means of a pulley and belt mechanism schematically illustrated by a phantom line 52, so that a rotating movement is transmitted between the shafts 17 and 18. Thus, a rotating movement in one direction applied to the drive shaft 17 causes the film mode switching door 20 to be taken out from the driven shaft 18 and to be wound on the drive shaft 17. Contrary to this, a rotating movement in the opposite direction applied to the drive shaft 17 causes the film mode switching door 20 to be taken out from the drive shaft 17 and to be wound on the driven shaft 18. The movement of the mode switching door 20 is guided by the intermediate shaft 19, so that an opening in the mode switching door 20 is moved between a first position, where the openings face a passageway to the ducts 6 and 7 to the upper outlets, a second position, where the openings face a passageway to the ducts 8 and 9 to the lower outlets, and a third position, where the opening faces a passageway to the duct 5 to the defroster outlet.

The mode switching door drive shaft 17 has an end located outside the casing 1 and connected to a rotary drive means such as a stepping motor 17-1. The stepping motor 17-1 can obtain a desired rotating position, which causes the opening of the mode switching door 20 to be stopped at a desired position, so that the air flow is discharged from a desired outlet. In a well known manner, the rotating position of the drive shaft 17 is controlled by a number of an electric pulses from a control circuit (not shown) realized as a microcomputer system.

Furthermore, the casing 1 is formed with a cool air by-pass passageway 21 for directly introducing the cooled air into the ducts 6 and 7 directed to the upper outlets. A by-pass door 22 as a swing door type is arranged so that it is moved between a position as shown by a solid line where the by-pass passageway 21 is opened and a position as shown by a dotted line where the by-pass passageway 21 is closed. The opened position of the by-pass door 22 is obtained during a maximum cooled condition where the air mix door 13 is located so that the hot air passageway 14 is fully closed.

Figure 2:
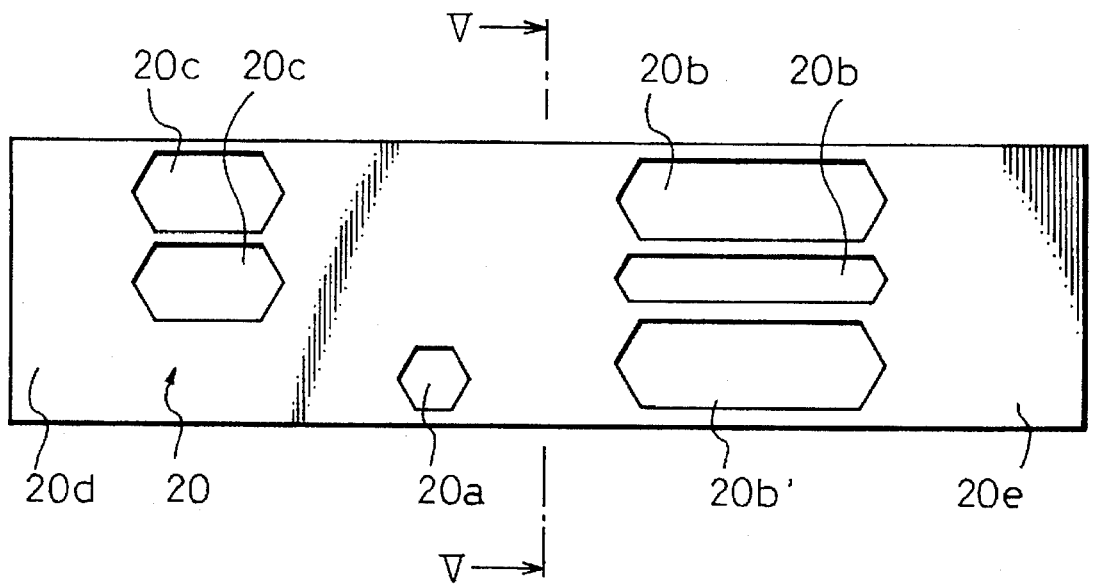
FIG. 2 is a developed view of a mode switching door in FIG. 1.

As shown in a developed view in FIG. 2, the mode switching door 20 is formed with a plurality of openings 20a to 20c. In more detail, on one side of the mode switching door 20 along its length, the openings 20b and 20c are located at a distance. On the other side of the mode switching door 20 along its length, the openings 20b' and 20a are located at a distance. Furthermore, the mode switching door 20 has opposite ends 20d and 20e in the direction of its length. The first end 20d is connected to the driven shaft 18, while the second end 20e is connected to the driving shaft 17. The movement of the mode switching door 20 by means of the rotating moment of the shaft 17 causes the positional relationship to be varied between the openings 20a to 20c and the outlets to the ducts 6 to 9, thereby obtaining a desired mode corresponding to the rotating position of the stepping motor 17. Namely, during an upper mode, the openings 20b are in communication with the duct 6 to the upper-center outlets, while the opening 20b' is in communication with the duct 7 to the upper-side outlets, so that the air flow is discharged from the upper outlets. During a lower mode, the openings 20b are in communication with the ducts 8 and 9 to the lower outlets, while the opening 20a is in communication with the duct 7 to the upper-side outlets, so that the air flow is discharged from the lower outlets, while a small amount of air is discharged from the upper side outlets. During a defroster mode, the openings 20c are in communication with the duct 5 to the defroster outlet, so that an air flow is discharged from the defroster outlet.

Figure 3:
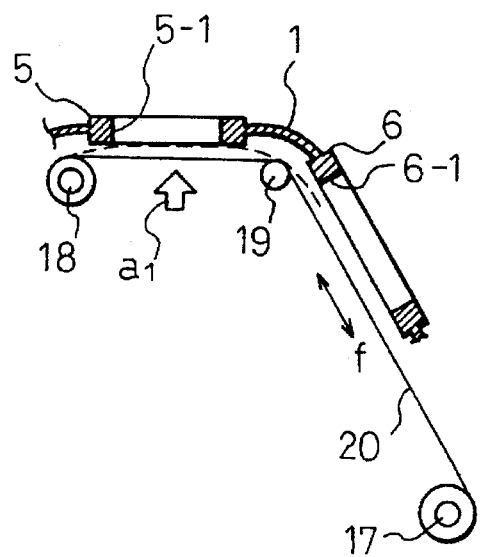
FIG. 3 is a schematic view illustrating a relationship between the mode switching door and the casing.

FIG. 3 schematically illustrates a relationship between the mode switching door 20, an inlet 5-1 of the defroster duct 5, and an inlet 6-1 of the upper-center outlet duct 6. The rotating movement of the shafts 17 and 18 causes the film door 20 to be moved, so that a desired switching of the direction of flow is obtained. In FIG. 3, the defroster mode is shown such that an air flow as shown by an arrow $a_1$ is directed to the opening 5-1, and to the defroster duct 5 via the openings 20c in FIG. 2. The pressure of the air flow causes the flexible film door 20 to be deformed as shown by dotted lines, which causes the door 20 to be contacted with an edge of the inlet 5-1. Such a contact between the film door 20 and the edge of the inlet 5-1 prevents an air flow from leaking to the other inlets, such as the inlet 6-1 to the upper duct 6. However, due to such a contact, the movement of the film door 20 as shown by the arrows f for obtaining a switching operation causes a frictional force to be generated between the film door 20 and the casing 1, thereby increasing the operational force of the drive motor required to obtain the switching operation. The frictional force is proportional to the friction coefficient between the film door 20 and the casing 1.

Figure 4:
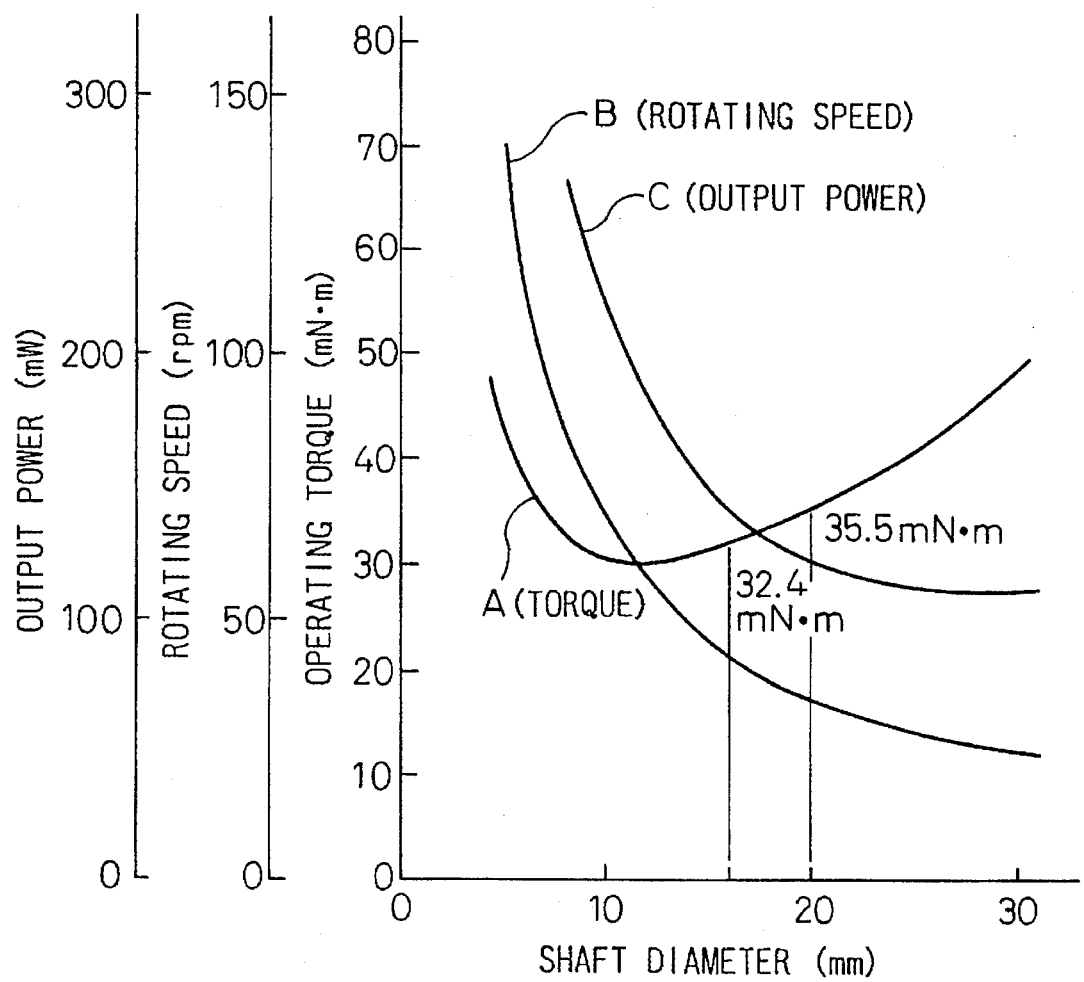
FIG. 4 shows curves, with respect to the diameter of the shaft, of torque, rotating speed and output power.

In addition to the friction between the film door and the casing, there are other factors which can increase the operational force, such as a bearing loss at the drive shaft 17, a force for flexing the film at the drive shaft 17, a rotating force transmitting loss between the drive and driven shafts 17 and 18, a bearing loss at the intermediate shaft 19, a force for flexing the film at the intermediate shaft 19, a frictional force between the film door and the intermediate shaft 19, and the diameters of the shafts 17 and 18. Among these factors, the diameters of the shafts are major factors which increase the operational force. First, a discussion is made as to how the diameter of the shafts affects to the operational force. Thus, a test was done for the mode switching door 20 of a width of 135.5 mm under a air flow pressure of 100 Pa and a speed of movement of the door of 4.4 seconds per a length of 160 mm. FIG. 4 is a result of the test. Namely, a curve A shows a relationship between a diameter of the shaft and the operating torque, a curve B shows a relationship between a diameter of the shaft and a rotating speed of the shaft, and a curve C shows a relationship between a diameter of the shaft and an output power of the drive motor. As will be understood from the curves, a value of diameter of the shaft smaller than 10 mm causes the outlet power of the drive motor 17-1 to rapidly increase, thereby requiring an increased size of the motor, which is not advantageous from the view point of an effective use of the limited space available in an automobile. A reduction in the output power of the drive motor 17-1 causes the winding speed to be greatly reduced, thereby reducing the response speed. An increase in the rotating speed for obviating this problem causes the operational noise to increase.

In the region where the diameter of the shaft is larger than 10 mm, the degree of the increase in the operational force is initially small and then gradually increases. However, an excessively large diameter of the shaft causes the size of the device to be increased, on one hand, and the resistance of the air flow to increase, on the other hand. Thus, a desired range of the diameter of the shaft is between 10 and 30 mm. In the shown embodiment, the diameter of the shaft is 16 mm.

Now, the frictional coefficient between the film door and the air conditioner casing 1 will be discussed. The frictional coefficient is determined by the material constructing the outer surface of the air conditioner casing 1, and the material constructing the outer surface of the film door. In the embodiment of the present invention, the air conditioner casing 1 is constructed of a polypropylene such as PP T 20 stipulated by the Japanese Industrial Standard (JIS) with outer coated layers made of a silicon material. As to the selection of a material constructing the air conditioner casing, a consideration should be taken so that a desired strength and a durability are obtained. As to the selection of a material constructing the film door, a consideration should be taken so that the film door is not corroded by condensed water condensed at the evaporator attached to the film door. According to the present invention, the frictional coefficient between the air conditional casing and the film shaped door is as small as 0.17, which can provide the maximum effect for suppressing an increase in the operational force caused by friction.

Figure 5:
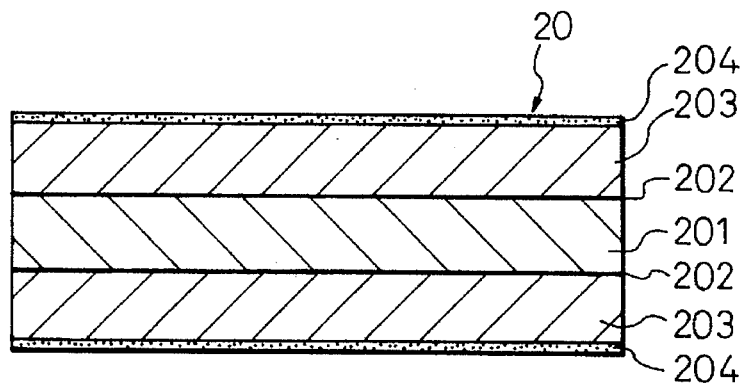
FIG. 5 is a cross-sectional view of the mode switching door, taken along a line V—V in FIG. 2.

As shown in FIG. 5, the mode switching door 20 is constructed as a multi-layer film including a basic layer 201 as a PPS film of a thickness of 50 μm and of an elasticity modulus of 400 (kgf/mm$^2$), intermediate layers 203 as nylon woven fabric of a thickness of 80 μm and of an elasticity modulus of 10 (kgf/mm$^2$), the intermediate layers 203 being adhered to the basic layers 201 on both surfaces thereof by means of layers 202 of adhesive, such as NBR modified epoxy adhesive of a thickness of 5 μm and of an elasticity modulus of 1.0 (kgf/mm$^2$), on the basic layer, and layers 204 of a silicon coating material of a thickness of 5 μm and of an elasticity modulus of 0.7 (kgf/mm$^2$), applied to outer surfaces of the nylon layers 203. In other words, the mode switching door 20 is constructed as a five layer structure.

The air mix door 13 is also constructed as a five layer structure similar to that of the mode switching door 20.

Now, the flexural rigidity of the film door will be discussed. An increase in a flexural rigidity of the film door makes it difficult for the door to be wound on the shaft, thereby increasing the operational force of the motor. In other words, a reduction of the value of the flexural rigidity is desirable for obtaining a reduced operational force. Contrary to this, a decrease in flexural rigidity of the film shaped door causes a wrinkle to be generated, causing gaps to be generated between the film door and the casing, thereby allowing air to leak via the gap. In order to reduce the amount of such a leakage of air, the flexural rigidity of the door should be increased. Thus, it is important that a value of the flexural modulus of the film shaped door is maintained in a range which can harmonize a requirement that an operating force should be reduced and a requirement that a sealing ability should be increased. According to the present invention, the inventor has found that a desired range of the value of the flexural rigidity of the film shaped door per width of 10 mm is between 1.1 (μNm$^2$) and 2.5 (μNm$^2$). In the illustrated embodiment, the flexural rigidity has a value of 2.14 (μNm$^2$). A value of the flexural rigidity EI of the film shaped door of the multi-layer structure as shown in FIG. 5 is calculated by $$EI = \Sigma E_i \times I_i$$

where $E_i$ is a Young's ratio of the material layer i (1 to 6) and $I_i$ is a moment of inertia of the layer i and is expressed by the following equation, that is, $I_i=\Sigma I_{zc}$, where $I_{zc}$ is a moment of inertia of the layer i a moment of the inertia about a neutral axis Zc and expressed by the following equation.

$$Zc = \frac{\Sigma Ei \times Z \times dy \times dz}{\Sigma Ei \times dy \times dz}$$

For the construction of the film door as shown in FIG. 5, the value of the Young's modulus and thickness of the respective layers are as shown in the following Table I.

TABLE I

| Layers | Young's Modulus (kgf/mm²) | Thickness (μm) |
| --- | --- | --- |
| PPS film (201) | 400 | 50 |
| Nylon fabric (203) | 10 | 80 |
| NBR adhesive (202) | 1.0 | 5 |
| Coating (204) | 0.7 | 5 |

The value of the flexural rigidity EI of the multi-layer film door per width of 10 mm, as calculated, is 2.14 (μNm²).

Figure 6:
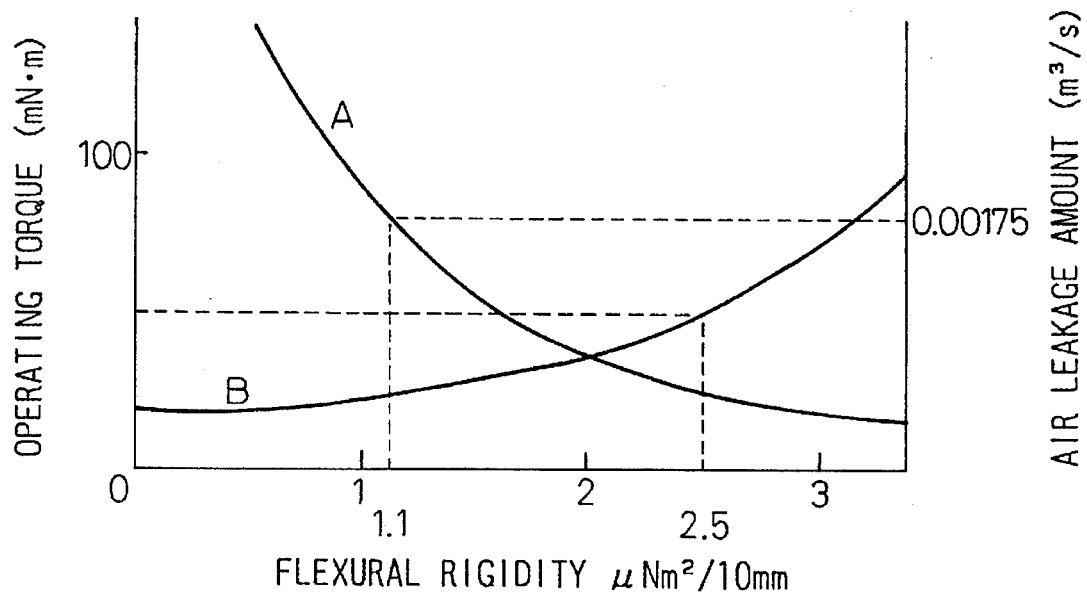
FIG. 6 shows curves, with respect to the diameter of the shaft, of operating force and leaked air amount.

In FIG. 6, curve A shows a relationship between the flexural rigidity of the mode switching door 20 and an operation force of the stepping motor 17-1 for causing the mode switching door 20 to be rotated. Curve B shows a relationship between the flexural rigidity of the mode switching door 20 and an amount of leaked air indicative of the sealing capability. The range of the flexural rigidity, which is equal to 2.5 (kgf/mm²) or less allows that the operational force for rotating the shaft 17 of the stepping motor is equal to 50 (mN×m), which is effective for preventing the size of the stepping motor from being increased, which makes the system to be suitable for an installation in the limited space inside the vehicle, while obtaining a desired smooth or quick operation of the door 20 or 13. Furthermore, a range of the flexural rigidity, which is equal to 1.1 (kgf/mm²) or more makes the leaked amount of air equal to 0.00175 (m²/s) or less. Namely, the following Table II shows a result of a test of a sensory test by a driver or passenger as to discomfort caused by the leaked air.

TABLE II

| Leaked Air Amount (m³/s) | Uncomfortability felt by Driver or Passenger |
| --- | --- |
| ≦0.0175 | None |
| >0.0175 <0.0025 | Yes but little |
| ≧0.025 | Yes |

In view of the above, in order to prevent a driver or passenger from feeling discomfort caused by leaked air, it is required that the leaked air amount is suppressed so that it is equal to 0.0175 or less.

I claim:

1. An air conditioning apparatus for a compartment to be air conditioned in an automobile, comprising:

a casing defining therein a passageway for an air flow to be introduced into the compartment;

a flexible film member cooperating with the passageway for controlling the flow of the air;

a first shaft rotatably supported by the casing, while one of the ends of the flexible film member is connected to the first shaft, so that the member is wound on the first shaft;

a second shaft rotatably supported by the casing, while the other end of the flexible film member is connected to the second shaft, so that the member is wound on the second shaft, and;

an electric motor for generating a rotating movement applied to at least one of the first and second shafts so that the flexible film member is moved for causing a degree of a cooperation between the film member and the passageway to be varied;

the flexible film member having a value of a flexural rigidity per width of 10 mm in a range between 1.1 and 2.5 (μNm²).

2. An air conditioning apparatus according to claim 1, wherein a blower is arranged in the casing for generating air flow in the passageway;

wherein said flexible film member with a pair of ends spaced along a length of the member, and having a first portion with an opening for a passage of the air flow and a second portion spaced from the first portion along the length of the member of preventing the air flow from being passed;

wherein said casing being, at a location of the passageway, formed with a seat portion defining an annular inner edge which cooperates with the flexible film member, and;

wherein the flexible film member being moved with respect to the seat portion between a first position where the first portion is seated on the seat portion for allowing a passage of the air flow and a second position where the second portion is seated on the seat portion for preventing a passage of the air flow.

3. An air conditioning apparatus according to claim 1, wherein said rotating movement generating means comprise an electric motor and a transmitting means for transmitting rotating movement between the first and second shafts.

4. An air conditioning apparatus according to claim 1, wherein the first and second shafts have a diameter of a value in a range between 10 and 30 mm.

5. An air conditioning apparatus according to claim 1, wherein said flexible film shaped member includes a PPS film.

6. An air conditioning apparatus according to claim 2, wherein said casing is, at least, at a location of the edge of the seat portion, made of a polypropylene, and wherein the flexible film shaped member has at a surface contacting the edge of the seat portion, a coating made of a silicone material.

* * * * *